No. 660,339. Patented Oct. 23, 1900.
R. RUSSELL.
WEED PULLER.
(Application filed Nov. 27, 1899.)
(No Model.) 3 Sheets—Sheet 3.
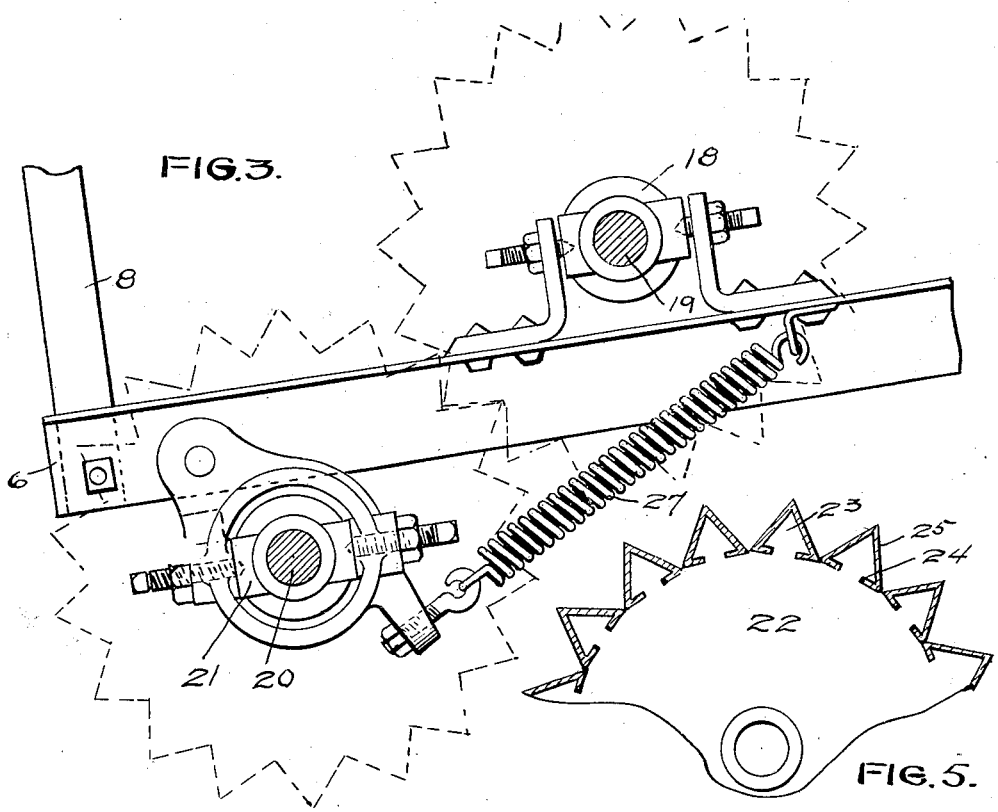
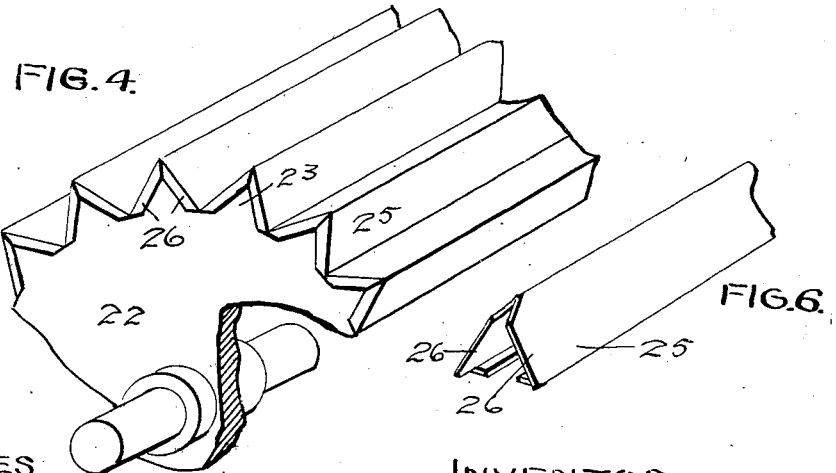
WITNESSES
E. G. Staude
Richard Paul
INVENTOR
RICHARD RUSSELL
BY Paul O. Hawley
HIS ATTORNEYS.
THE NORRIS PETERS CO., PHOTO-LITHO., WASHINGTON, D. C.

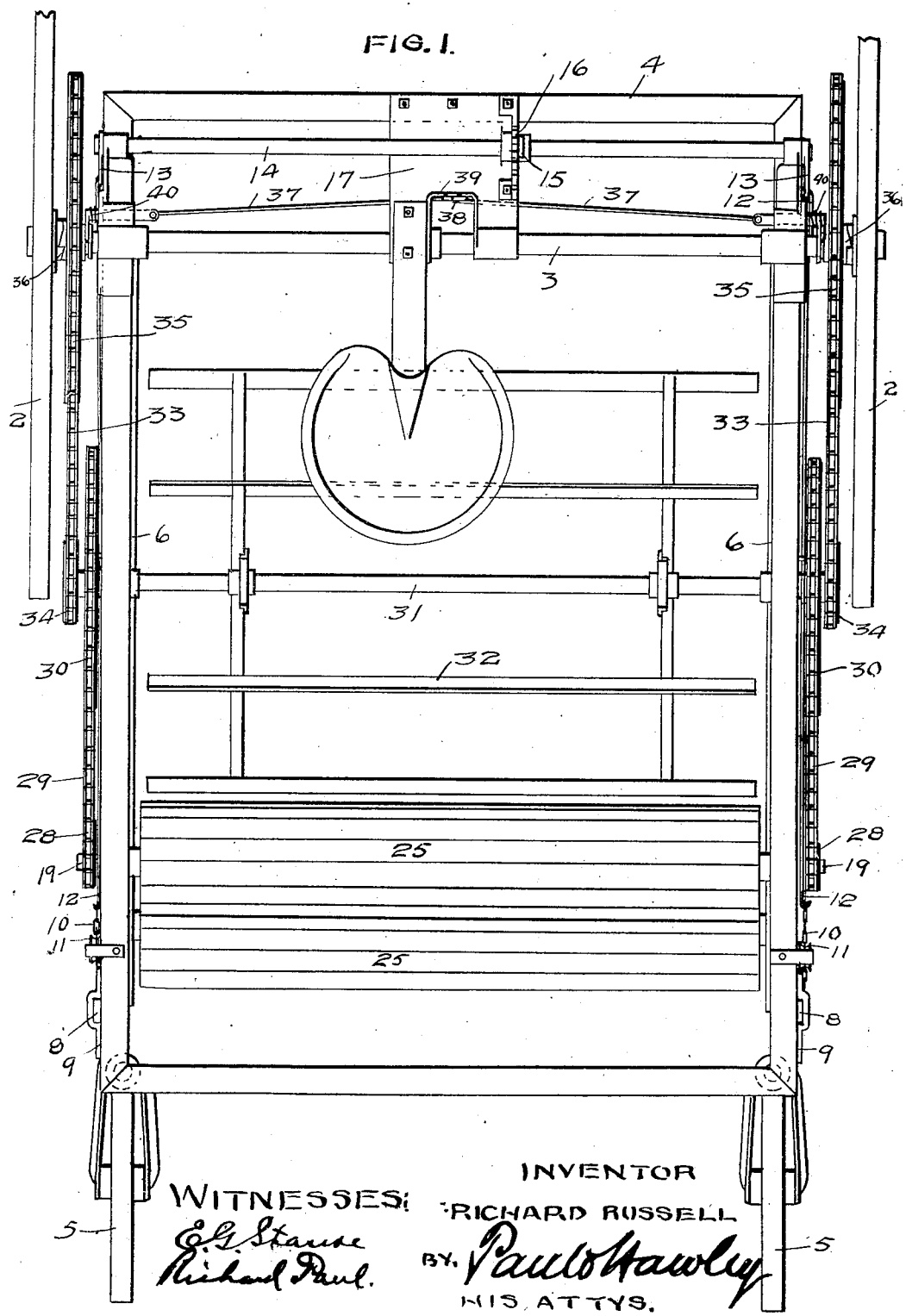

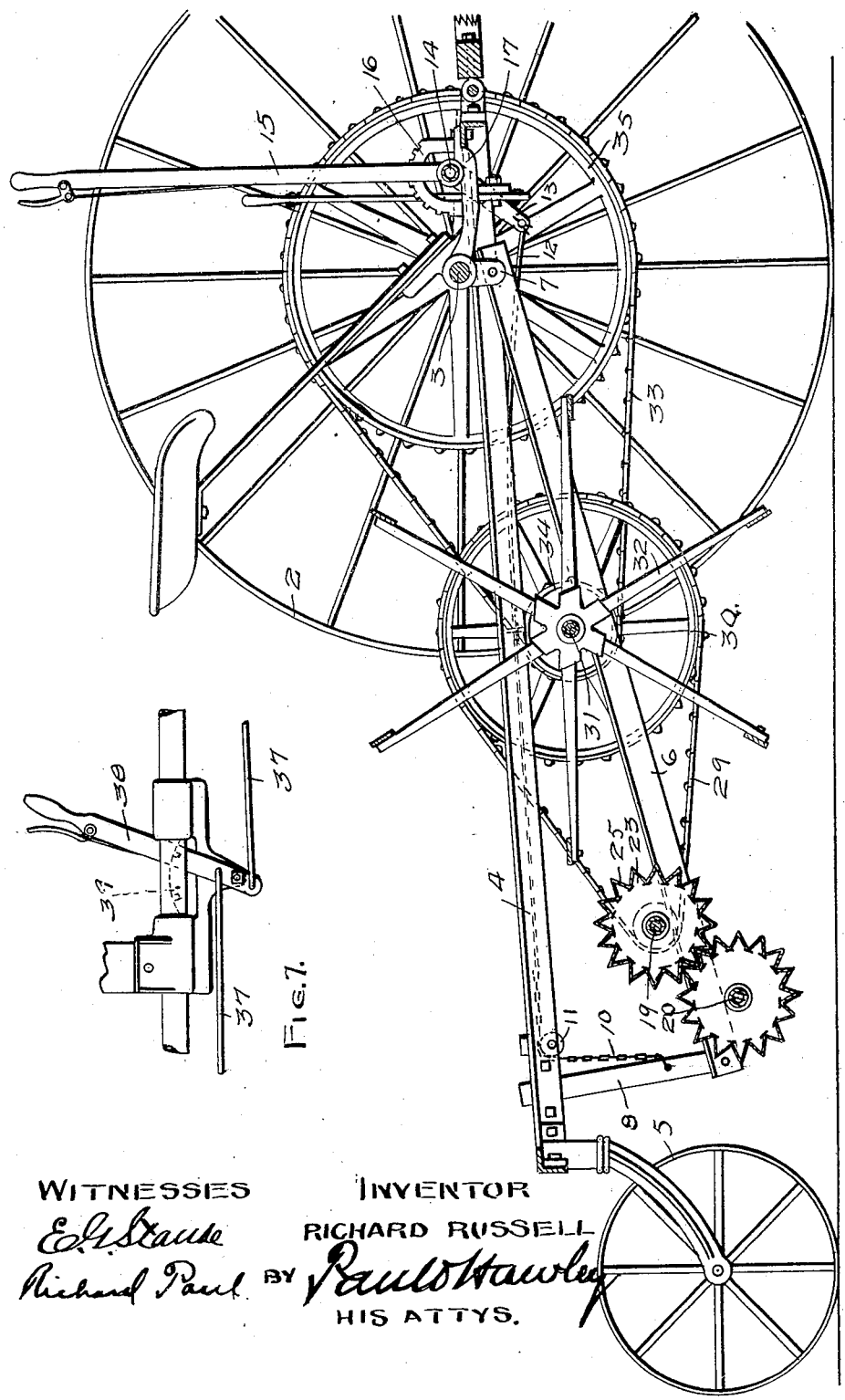

UNITED STATES PATENT OFFICE.

RICHARD RUSSELL, OF STEPHEN, MINNESOTA.

WEED-PULLER.

SPECIFICATION forming part of Letters Patent No. 660,339, dated October 23, 1900.

Application filed November 27, 1899. Serial No. 738,257. (No model.)

*To all whom it may concern:*

Be it known that I, RICHARD RUSSELL, of Stephen, Marshall county, Minnesota, have invented certain new and useful Improvements in Weed-Pullers, of which the following is a specification.

My invention relates to machines for pulling weeds from the soil; and the object of the invention is to provide an improvement over the apparatus designed for the same purpose shown and described in my United States Patent No. 639,618, granted December 19, 1899.

The invention consists generally in various constructions and combinations, all as hereinafter described, and particularly pointed out in the claims.

In the accompanying drawings, forming part of this specification, Figure 1 is a plan view of a weed-puller embodying my invention. Fig. 2 is a longitudinal section of the same. Fig. 3 is a detail of the ends of the rolls which engage the weed-stalks. Fig. 4 is a detail showing the construction of one of the rolls. Figs. 5 and 6 are details showing the method of securing the corrugations or teeth thereon. Fig. 7 is a detail of the mechanism for throwing the machine into or out of gear.

In the drawings, 2 represents the wheels; 3, the axle, whereon is supported the forward end of a rectangular frame 4, preferably of angle-iron on account of its rigidity, and supported at its rear end by caster-wheels 5.

Beneath the frame 4 are angle-bars 6, pivotally supported at their forward ends upon lugs or ears 7, having bearings on the axle and forming a roll-supporting auxiliary frame, and at their rear ends provided with links or bars 8, that are vertically slidable in guides 9 on the sides of the frame 4 above. To support the rear ends of the bars 6 and to adjust the same at the desired distance from the ground, I provide chains 10, connected to said links 8 near the bars 6 and passing over pulleys 11 on the frame 4 are secured to rods 12, whose forward ends are pivotally connected to arms 13 on a shaft 14, mounted in bearings on the forward end of the frame 4. This shaft is rotated by means of a lever 15, and said lever may be locked by means of a latch and pawl engaging the teeth of a curved rack-bar 16, provided on a plate 17, that is secured near the middle of the machine to the frame and axle. By moving the lever 15 back and forth the operator may raise or lower the bars 6 and the mechanism carried thereon, adjusting it at different distances from the ground, according to the height of the weeds to be pulled.

Mounted in bearings 18 on the bars 6 near their rear ends is a shaft 19, and in the rear of said shaft 19, beneath said bars 6, is a similar shaft 20, supported in bearings 21, that are pivotally connected to the bars 6, permitting the shaft 20 to swing back and forth toward or from the shaft 19, which is preferably stationary with respect to the frame or bars 6, whereon it is supported, though turning freely in its bearings. Upon these two shafts I provide rolls having corrugated surfaces and each comprising a series of disks 22, secured at intervals upon said shafts, there being preferably one at each end of the shaft and one in the middle, and these disks are provided on their peripheries with a series of teeth or projections 23, having slots or recesses 24 in their bases to receive the inwardly-turned edges of metal sheets 25, that are bent into a form triangular in cross-section to fit over said teeth and form the corrugated surfaces of the roll. To put the rolls together, the edges at the ends of each metal section are inserted into the slots in the teeth of one of the end disks and pushed through the slots in the teeth of the other disks, and when in place the corners at the bottom of each sheet or section will engage the corners of the adjoining sections and the edges of the same will be locked in their slots against lateral movement. Longitudinal movement is prevented by providing lips 26 at the ends of the sections to be bent down over the surfaces of the teeth. I prefer to construct the rolls in this manner, as they will be much lighter than if made solid, and, the corrugations being made up in sections, any of the teeth on becoming broken or worn may be quickly removed and a new one substituted therefor. I also regard this hollow built-up form of roll cheaper to manufacture than those that are made solid or, being hollow, have their teeth or corrugations formed integrally. The rear roll while permitted to swing freely on its bearings is held in yielding contact with the forward roll by springs 27, provided on the bars 6.

The shaft 19 projects beyond the bars 6, upon each side, and is provided with sprocket-wheels 28, over which chains 29 pass to larger sprocket-wheels 30 on a reel-shaft 31, that is also mounted in bearings on the bars 6 in front of the forward roll. Upon said shaft is a reel 32, which is adapted to direct the heads of weeds or other material that is to be pulled into position to be engaged by the corrugations on the rolls. The reel-shaft, which also projects beyond the bars 6 upon each side of the machine, is driven by sprocket-chains 33, which pass over wheels 34 and 35, provided, respectively, on the reel-shaft and the axle 3 of the machine. The reel-shaft in turn drives the forward roll, whose corrugations engaging those on the rear roll revolve it also.

It is frequently desirable to throw the machine out of gear, so that the reel and rolls will not be operated as the machine is moved across the field, and I therefore arrange the sprocket-wheels 35 to slide upon the axle 3, and in connection therewith and the wheels 2 provide clutches 36, of ordinary construction, that are operated by means of rods 37, connected to a lever 38, above and below its pivot, respectively, as shown in Fig. 7, said lever having a latch-and-pawl device to engage the teeth of a rack 39 and permit the operator to set the lever and lock the clutches when it is desired to prevent the rolls from operating. Springs 40 normally hold the clutch mechanism on the sprocket-wheels 35 in engagement with the mechanism on the wheels when the machine is in operation.

The operation of my improved weed-pulling machine is as follows: The rolls having been adjusted the desired distance from the ground, the machine is started across the field, and the revolving reels engaging the heads of the weeds will direct the same between the revolving rolls, the teeth of which engaging the stalks of the weeds will drag the roots out of the ground, the rear roll yielding sufficiently in its bearings to permit the weed-stalks and other foreign material to pass between the rolls and be discharged at the rear of the machine.

Obviously the details of construction which I have herein shown and described may be modified in many ways by any one skilled in the art, and I therefore do not wish to be confined to what is herein set forth.

Having thus described my invention, I claim as new and desire to secure by Letters Patent—

1. In a machine of the class described, the combination, with an axle and its wheels, of a frame supported thereon, caster-wheels provided at the rear end of said frame, the bars 6 pivotally supported on said axle and forming a pivoted frame, guide-links provided at the rear of said bars slidable in guides on said machine-frame, rolls carried by said bars, and means for revolving the same, and means for raising and lowering the rear ends of said bars to elevate or depress said rolls, substantially as described.

2. In a machine of the class described, the combination, with a wheeled frame, of a pivoted auxiliary frame supported beneath said wheeled frame, guides for the rear end of said auxiliary frame, means for raising or lowering the rear ends of said auxiliary frame, a roll mounted in fixed bearings on said auxiliary frame, a reel in advance of said roll, means for driving said reel and said roll, a second roll supported in swinging bearings in the rear of said first-named roll, both of said rolls having corrugated surfaces, and means for holding the rear roll in yielding contact with the forward roll, whereby it is driven by the revolution of said forward roll, substantially as described.

3. In a machine of the class described, two rolls having coacting corrugated surfaces and each roll comprising a series of toothed disks arranged at intervals upon a shaft, said teeth having slotted bases and metal sections triangular in cross-section, having inwardly-turned edges to enter the slots in the bases of said teeth and be locked therein by engagement with the adjoining sections and said sections together forming the corrugated surfaces of said rolls, substantially as described.

4. A roll for weed-pulling machines, comprising a shaft, a series of disks secured at intervals thereon, said disks having toothed peripheries provided with slots in their bases, and metal sections triangular in cross-section having their edges inwardly turned to enter said slots, the base of each section being in engagement with the bases of the adjoining sections, whereby the edges of each section are locked in the slots against lateral movement, substantially as described.

5. A corrugated roll for weed-pulling machines, comprising a shaft, a series of disks mounted at intervals thereon, said disks having toothed or corrugated peripheries, and metal sections substantially triangular in cross-section fitting the teeth of said disk and removably secured over the same, substantially as described.

6. In a machine of the class described, the combination, with an axle and its wheels, of a frame supported at its forward end thereon, caster-wheels supporting the rear end of said frame, an auxiliary frame supported at its forward end on said axle and extending back beneath said first-named frame, means within control of the operator on the machine for raising and lowering the rear end of said auxiliary frame, rolls mounted in bearings near the rear end of said auxiliary frame, one of said rolls being connected with the axle-wheels to be driven thereby and the other roll but yieldingly mounted and having its surface in contact with the surface of said first-named roll, whereby said second roll is driven also, substantially as described.

7. In a machine of the class described, the combination, with an axle and its wheels, of a frame supported at its forward end thereon, suitable means supporting the rear end of said frame, an auxiliary frame pivotally supported at its forward end on said axle and extending back beneath said first-named frame, means within control of the operator on the machine for raising or lowering said auxiliary frame, a roll mounted in bearings on said auxiliary frame and having a series of corrugations in its surface and driven from said axle-wheels, a second roll also mounted in bearings on said auxiliary frame and having a series of corrugations in its surface in engagement with the corrugations of said first-named roll, whereby said second-named roll is driven by the revolution of said first-named roll, substantially as described.

8. In a machine of the class described, the combination, with an axle and its wheels, of a frame supported at its forward end thereon, means supporting the rear end of said frame, an auxiliary frame pivotally supported at its forward end on said axle and extending beneath said machine-frame, a reel mounted in bearings on said auxiliary frame and connected with the axle-wheels to be driven thereby, a roll mounted in bearings on said auxiliary frame in the rear of said reel, means connecting said roll and said reel, whereby said roll is driven by the operation of said reel, and a second roll mounted in yielding bearings on said auxiliary frame in the rear of said first-named roll and having its peripheral surface in contact with the surface of said first-named roll, whereby said rolls are operated, simultaneously, substantially as described.

9. In a machine of the class described, the combination, with a wheeled frame, of an auxiliary frame pivotally supported and extending back beneath said wheeled frame, rolls having corrugated surfaces mounted in bearings near the rear end of said auxiliary frame, a reel mounted in said auxiliary frame in front of said rolls, means connecting said rolls and said reel with the axle-wheels, and means within control of the operator stationed on the machine for raising or lowering the rear end of said auxiliary frame to adjust said rolls and reel at different heights from the ground, substantially as described.

In witness whereof I have hereunto set my hand this 18th day of November, 1899.

RICHARD RUSSELL.

In presence of—
GREELEY E. CARR,
CHAS. BURSETH.